US007497157B2

United States Patent
Aoki et al.

(10) Patent No.: US 7,497,157 B2
(45) Date of Patent: Mar. 3, 2009

(54) FUEL SUPPLY PUMP AND TAPPET STRUCTURAL BODY

(75) Inventors: Nobuo Aoki, Shiki (JP); Yusuke Fukuhara, Higashimatsuyama (JP); Kinji Mayuzumi, Honjo (JP)

(73) Assignee: Bosch Corporation, Tokyo (JP)

( * ) Notice: Subject to any disclaimer, the term of this patent is extended or adjusted under 35 U.S.C. 154(b) by 259 days.

(21) Appl. No.: 10/580,885

(22) PCT Filed: Jan. 7, 2005

(86) PCT No.: PCT/JP2005/000100

§ 371 (c)(1),
(2), (4) Date: May 25, 2006

(87) PCT Pub. No.: WO2005/068822

PCT Pub. Date: Jul. 28, 2005

(65) Prior Publication Data

US 2007/0134115 A1 Jun. 14, 2007

(30) Foreign Application Priority Data

Jan. 14, 2004 (JP) ............................. 2004-006199

(51) Int. Cl.
*F16J 1/10* (2006.01)
*F16H 53/06* (2006.01)

(52) U.S. Cl. .......................................... 92/129; 74/569

(58) Field of Classification Search ..................... 92/72, 92/73, 129, 153; 74/569
See application file for complete search history.

(56) References Cited

U.S. PATENT DOCUMENTS

| | | | | |
|---|---|---|---|---|
| 3,822,683 | A * | 7/1974 | Clouse | 74/569 |
| 5,622,152 | A * | 4/1997 | Ishida | 123/446 |
| 6,405,698 | B1 * | 6/2002 | Steinmetz | 74/569 |

FOREIGN PATENT DOCUMENTS

| | | | |
|---|---|---|---|
| DE | 4421535 | A | 12/1995 |
| DE | 19909418 | A | 9/2000 |
| JP | 49-95062 | A | 9/1974 |
| JP | 58-001768 | U | 1/1983 |
| JP | 08-021332 | A | 1/1996 |
| JP | 11-200989 | A | 7/1999 |
| JP | 2001-317430 | | 11/2001 |
| JP | 2003-206707 | A | 7/2003 |

* cited by examiner

*Primary Examiner*—Michael Leslie
(74) *Attorney, Agent, or Firm*—Carmody & Torrance LLP

(57) ABSTRACT

The present invention provides a fuel supply pump which is suitably used in a booster-type accumulator fuel injection device and a tappet structural body which is suitable for the fuel supply pump. For this end, in a tappet structural body which includes a roller and a tappet body portion which houses a roller therein and a fuel supply pump provided with the tappet structural body, the roller is rotatably held on a roller receiver of the tappet body portion and the tappet structural body includes a plate-like or a wire-like restricting means which restricts the movement of the roller in the rotary axis direction.

6 Claims, 19 Drawing Sheets

Fig.9

FUEL SUPPLY PUMP AND TAPPET STRUCTURAL BODY

CROSS REFERENCE TO RELATED APPLICATIONS

This application is a National Stage application of International Application No. PCT/JP2005/000100, filed Jan. 7, 2005.

TECHNICAL FIELD

The present invention relates to a fuel supply pump and a tappet structural body, and more particularly to a tappet structural body which can reduce damages on an inner peripheral surface of a pump housing caused by an end portion of a roller even when a pump is rotated at a high speed and is suitably applicable to a booster-type accumulator fuel injection device, and a fuel supply pump which includes such a tappet structural body.

BACKGROUND ART

Conventionally, in a diesel engine or the like, to inject high-pressure fuel efficiently, various accumulator fuel injection devices which use an accumulator (a common rail) have been proposed.

As a fuel supply pump which is applicable to such an accumulator fuel injection device, there has been adopted a fuel supply pump which includes a cam which is rotatably integrally mounted on a cam shaft which is rotated by driving an engine, a plunger which is elevated due to the rotation of the cam, a tappet structural body which transmits the rotation of the cam to the plunger as a rising force, and a return spring which imparts a lowering force to the tappet structural body and the plunger. Here, as the tappet structural body which is applicable to the fuel supply pump, as shown in FIG. 19, there has been proposed a tappet structural body which is constituted of a tappet body portion which includes a cylindrical slide portion which is slidably inserted in a cylindrical slide surface and a roller holding portion which extends toward one axial end of the slide portion, a pin which has both ends thereof held by the roller holding portion of the tappet body portion, and a roller which is rotatably held by the pin (see Patent Document 1, for example).

[Patent Document 1] JP-A-2001-317430 (FIG. 2)

DISCLOSURE OF THE INVENTION

Problems to be Solved by the Invention

However, the tappet structural body disclosed in Patent Document 1 is configured to expose end portions of the roller pin to the outside. Accordingly, when the tappet structural body is mounted in the inside of a pump housing and the pump is rotated at a high speed, the tappet structural body is vigorously vertically moved in the inside of the pump housing and hence, the roller and the roller pin are tilted in the rotary axis direction thus giving rise to a case in which the end portion of the roller pin comes into contact with an inner peripheral surface of the housing. Accordingly, there has been a drawback that the inner peripheral surface of the pump housing is liable to be easily damaged and exhibits poor durability.

Accordingly, inventors of the present invention have made extensive studies and, as the result of studies, have found that by restricting the movement of the roller or the roller pin in the rotary axis direction by providing a predetermined restricting means, even when the pump is rotated at a high speed, it is possible to prevent the end portion of the roller or the roller pin from coming into contact with the inner peripheral surface of the pump housing.

That is, it is an object of the present invention to provide a tappet structural body which can prevent damages on an inner surface of the pump housing caused by a roller or a roller pin even when a fuel supply pump is rotated at a high speed for a long time to cope with a booster-type accumulator fuel injection device and can sufficiently perform the pressurizing processing of fuel, and a fuel supply pump which includes such a tappet structural body.

Means for Solving the Problems

According to the present invention, in a fuel supply pump having a tappet structural body which includes a roller and a tappet body portion which houses a roller, the roller is rotatably held by a roller receiver of a tappet body portion and the fuel supply pump includes a plate-like or a wire-like restricting means which restricts the movement of the roller in the rotary axis direction thus overcoming the above-mentioned drawbacks.

Here, the roller includes the roller and the roller pin which constitutes a rotary shaft of the roller.

That is, with the provision of the tappet structural body which includes the predetermined restricting means which restricts the movement of the roller in the rotary axis direction, even with the simple structure, the tappet structural body can prevent the end portion of the roller or the roller pin from coming into contact with the inner peripheral surface of the pump housing. Accordingly, even when the pump is rotated at a high speed, it is possible prevent the occurrence of damages on the inner peripheral surface of the pump housing thus remarkably enhancing the durability of the pump housing.

Further, by allowing the roller receiver of the tappet body portion to rotatably hold the roller, a load from the roller can be received by the tappet body portion as a whole and hence, the roller can withstand the higher load. Accordingly, even when the pump is rotated at a high speed, it is possible to enhance the durability of the pump.

Further, in constituting the fuel supply pump of the present invention, it is preferable that the plate-like restricting means is constituted by extending a portion of a peripheral portion of a spring seat in the direction toward the end portion of the roller.

Further, in constituting the fuel supply pump of the present invention, it is preferable that the plate-like restricting means is inserted into an insertion hole formed in the tappet body portion and a gap is formed around the plate-like restricting means in the insertion hole.

Further, in constituting the fuel supply pump of the present invention, it is preferable that the plate-like restricting means includes a bent portion for supporting and receiving the roller.

Further, in constituting the fuel supply pump of the present invention, it is preferable that the wire-like restricting means is formed of a spring member and the spring member is wound around the tappet body portion.

Further, in constituting the fuel supply pump of the present invention, it is preferable that a pawl portion is formed on both ends of the wire-like restricting means and the pawl portion is engaged with the roller receiver of the tappet body portion.

Here, the pawl portion implies, as shown in FIG. 18, a portion of the spring member which is formed by bending an end portion of the spring member in the predetermined direction.

Further, in constituting the fuel supply pump of the present invention, it is preferable that the roller includes a pin portion which constitutes the center of rotation of the roller and a roller portion which is a thick wall portion which is formed around the pin portion and is rotatable while being in a slide contact with a roller body and the pin portion and the roller portion are integrally formed.

Further, in constituting the fuel supply pump of the present invention, it is preferable that the fuel supply pump is applicable to a booster-type accumulator fuel injection device which pressurizes fuel having a flow rate per unit time of 500 to 1500 litter/hour to a value of 50 MPa or more.

Further, another aspect of the present invention is directed to a tappet structural body which includes a roller and a tappet body portion which houses the roller, wherein the roller is rotatably held on a roller receiver of the tappet body portion and the tappet structural body includes a plate-like or wire-like restricting means which restricts the movement of the roller in the rotary axis direction.

Further, in constituting the tappet structural body of the present invention, it is preferable that the roller includes a pin portion which constitutes the center of rotation of the roller and a roller portion which is a thick wall portion which is formed around the pin portion and is rotatable while being in a slide contact with a roller body and the pin portion and the roller portion are integrally formed.

BEST MODE FOR CARRYING OUT THE INVENTION

First Embodiment

Figure 1:
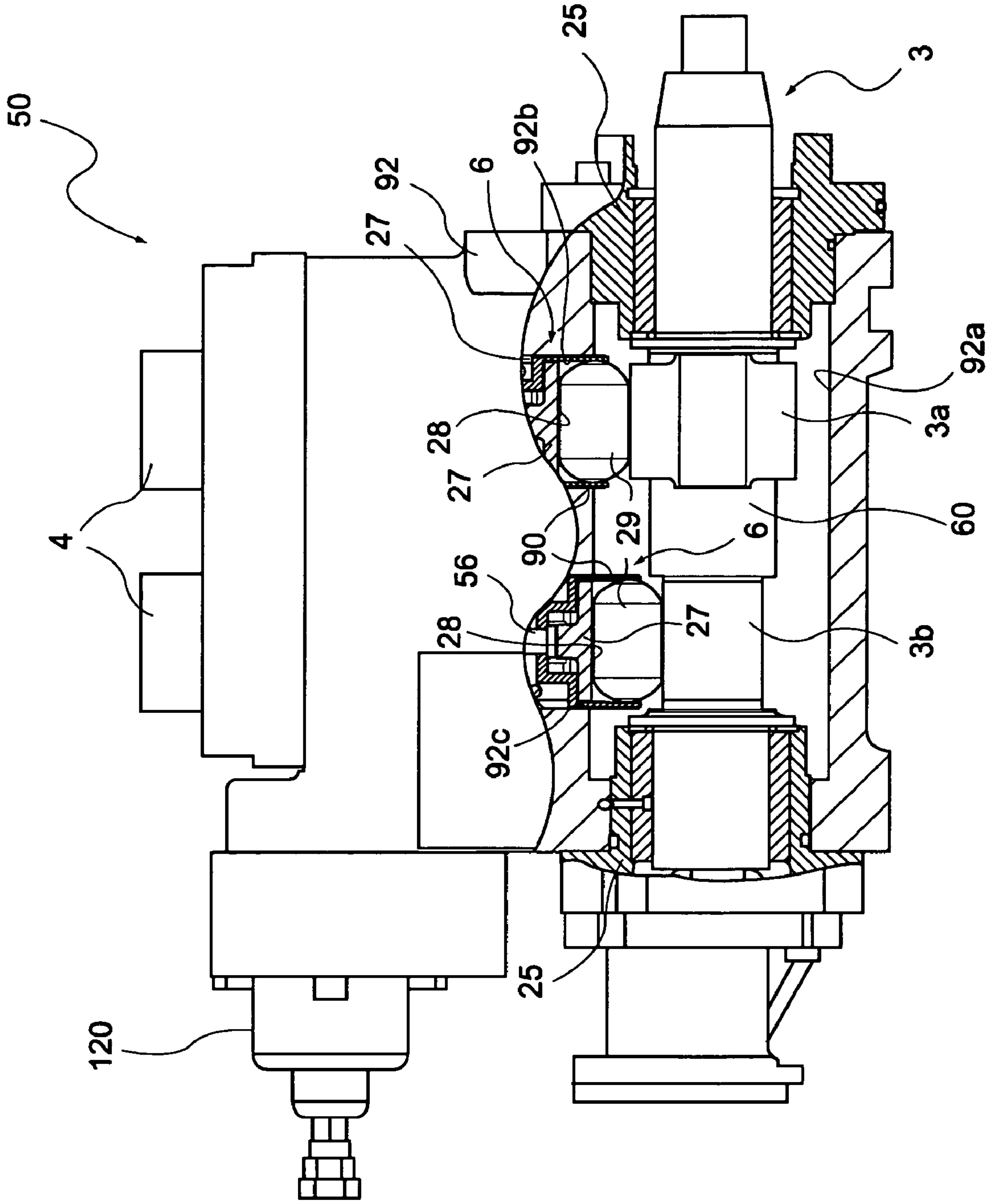
FIG. 1 is a side view with a part broken away of a fuel supply pump of the present invention.

The first embodiment is, as illustrated in FIG. 1, is directed to a fuel supply pump 50 which includes a tappet structural body 6, wherein the tappet structural body 6 includes a roller 29 and a tappet body portion 27 which houses the roller 29. Here, a roller receiver 28 of the tappet body portion 27 is allowed to rotatably hold the roller 29 and the tappet structural body 50 includes a plate-like or wire-like restricting means 90 for restricting the movement of the roller 29 in the rotary axis direction.

Hereinafter, the fuel supply pump 50 is specifically explained with respect to respective constitutional features.

1. Basic Configuration of Fuel Supply Pump

Figure 2:
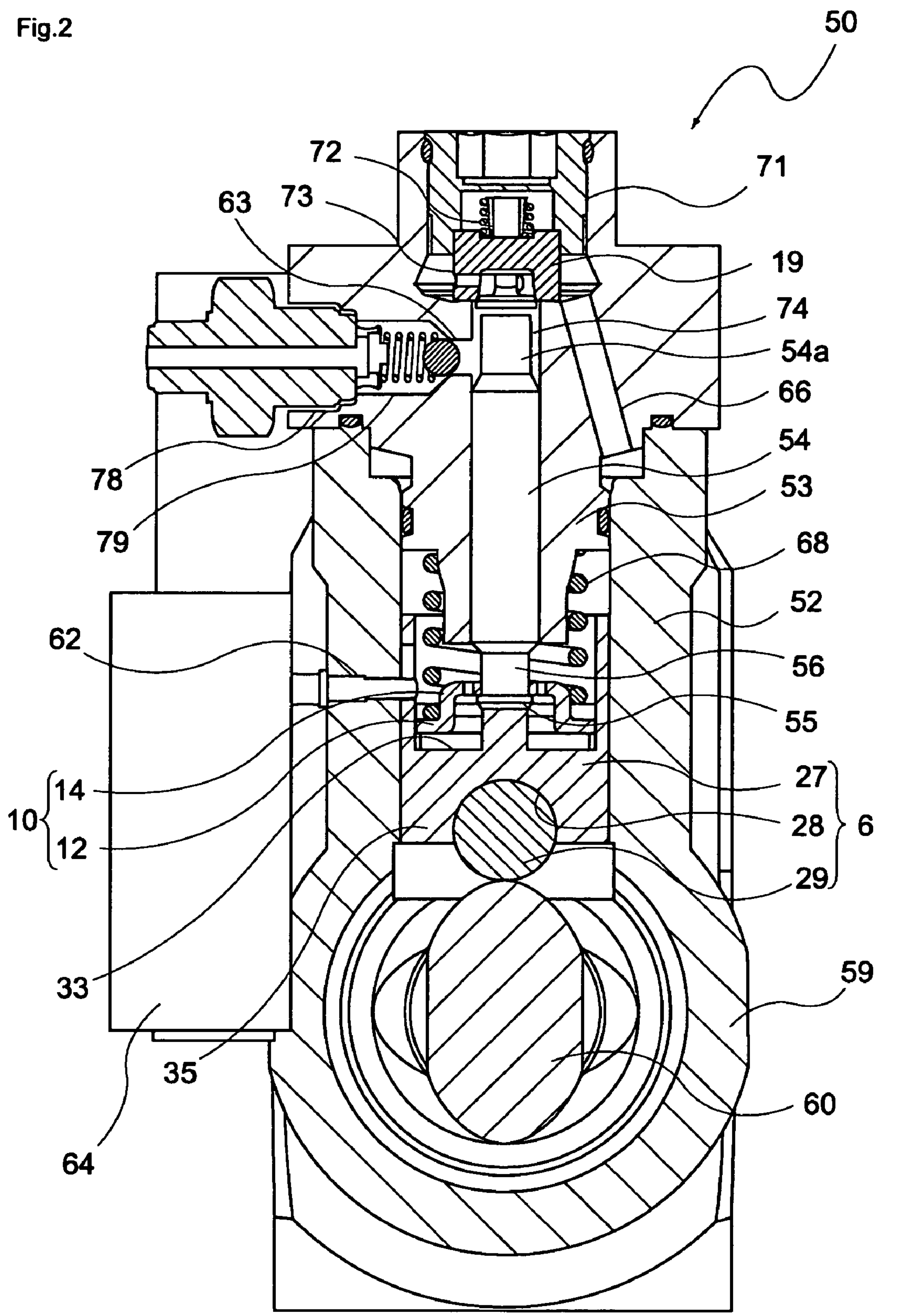
FIG. 2 is a cross-sectional view of the fuel supply pump of the present invention.

Although the basic configuration of the fuel supply pump is not particularly limited, for example, it is preferable to adopt the structure of the fuel supply pump 50 shown in FIG. 1 and FIG. 2. That is, the fuel supply pump 50 may preferably include, for example, a pump housing 52, plunger barrels (cylinders) 53, plungers 54, a spring seat 10, the tappet structural bodies 6 and cams 60.

Further, in the inside of each plunger barrel 53 which is housed in the pump housing 52, a fuel compression chamber 74 is formed, wherein the plunger 54 reciprocates in the fuel compression chamber 74 in response to the rotary movement of the cam 60 so as to pressurize the fuel introduced into the fuel compression chamber 74. Accordingly, in the fuel compression chamber 74, it is possible to efficiently pressurize the fuel which is forcibly fed from a feed pump to form high-pressurized fuel using the plunger 54.

Here, in the fuel supply pump 50 of this embodiment, for example, although two sets of the plunger barrels 53 and plungers 54 are provided in the inside of the pump housing 52, for processing a large amount of fuel at a high-pressure, it may be also preferable to increase the number of sets of the plunger barrels 53 and plungers 54 to two or more.

(1) Pump Housing

As exemplified in FIG. 2, the pump housing 52 is a casing which accommodates the plunger barrels 53, the plungers 54, the tappet structural bodies 6 and the cams 60. It is preferable that the pump housing 52 includes a shaft insertion hole and columnar spaces which are opened in the vertical direction.

(2) Plunger Barrel (Cylinder)

The plunger barrels 53 are, as illustrated in FIG. 1 and FIG. 2, housings for supporting the plungers 54 and are elements which constitute portions of the fuel compression chambers (pump chambers) 74 for pressurizing a large quantity of fuel to a high pressure using the plungers 54. Further, the plunger barrel 53 may preferably be mounted on upper opening portions of columnar spaces 92*b*, 92*c* of the pump housing 52 for facilitating the assembling.

Here, when the type of fuel supply pump on which the plunger barrels are mounted is either an in-line type or a radial type, the configuration of the plunger barrels may be suitably changed corresponding to the respective types.

(3) Plunger

The plungers 54 are, as illustrated in FIG. 1 and FIG. 2, main elements for pressurizing the fuel in the fuel compression chambers 74 formed in the inside of the plunger barrels 53 to a high pressure. Accordingly, the plungers 54 may preferably be elevatably arranged in the inside of the plunger barrels 53 which are respectively mounted in the columnar spaces 92*b*, 92*c* of the pump housing 52.

Here, to enable the pressurizing processing of the large quantity of fuel by driving the plungers at a high speed, it is preferable to set a rotational speed of the pump to a value which falls within a range of 1500 to 4000 rpm and, at the same time, it is preferable to set the rotational speed of the pump to a value which falls within a range of 1 to 5 times as large as a rotational speed of the engine taking a gear ratio into consideration.

(4) Fuel Compression Chamber

The fuel compression chamber 74 is, as shown in FIG. 2, a small chamber which is formed in the inside of the plunger barrel 53 together with the plunger 54. Accordingly, in such a fuel compression chamber 74, by driving the plunger 54 at a high speed, it is possible to efficiently pressurize a large quantity of the fuel which quantitatively flows in the fuel compression chamber 74 byway of the fuel supply valve 73. Here, it is preferable that, to prevent a lubricant or lubrication fuel in the inside of the spring holding chamber from impeding the high-speed operation of the plunger 54 even when the plunger 54 is driven at a high speed, the spring holding chamber and the cam chamber are communicated with each other by a passing hole or the like described later.

Figure 3:
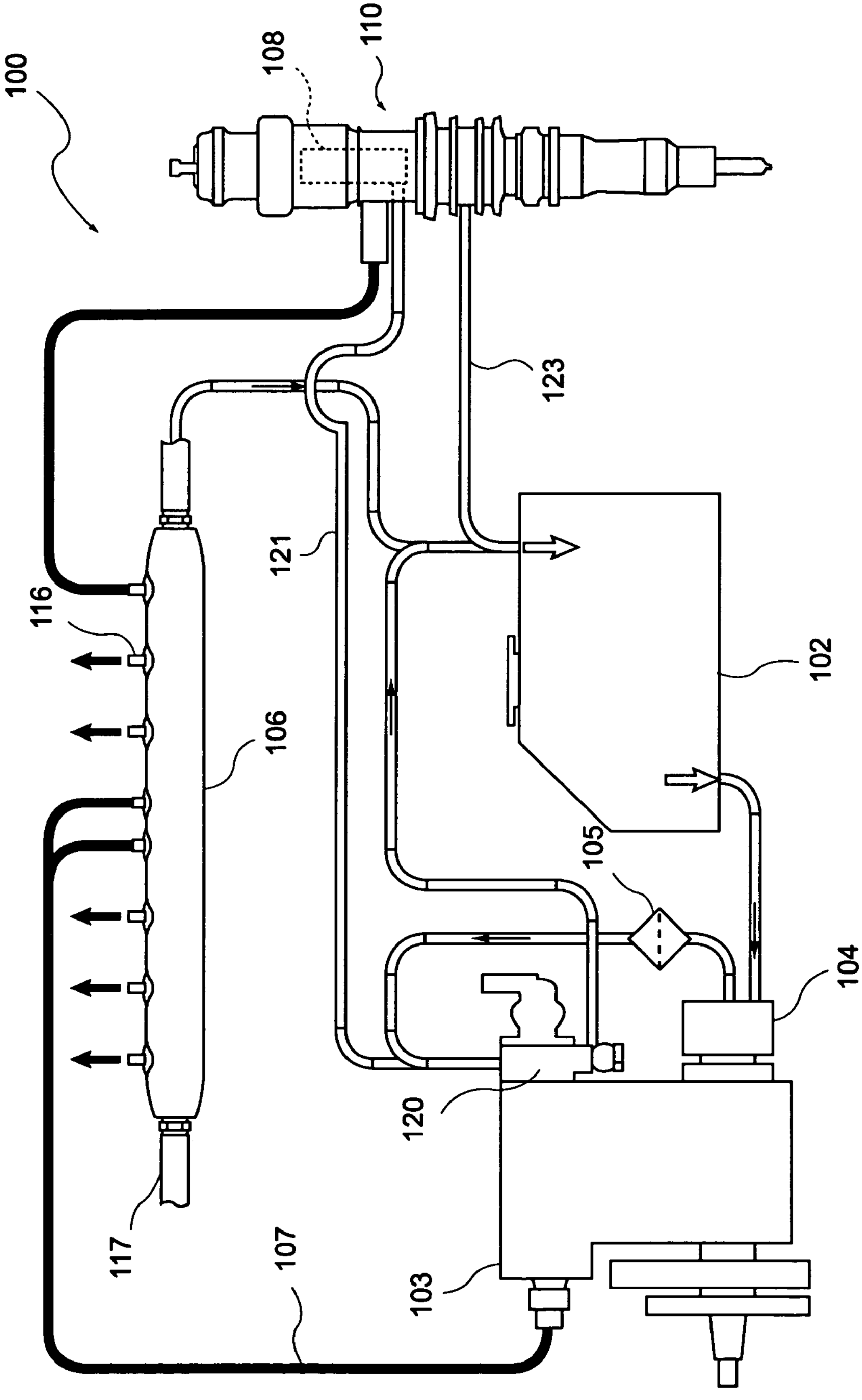
FIG. 3 is a view for explaining a system of a booster-type accumulator fuel injection device.

On the other hand, after the pressurizing of the fuel using the plunger 54 is finished, the pressurized fuel is supplied to a common rail 106 shown in FIG. 3 by way of a fuel discharge valve 79.

(5) Tappet Structural Body

The tappet structural body 6 is a member which serves to transmit a driving force to the plungers from the cams and may preferably be constituted of a spring seat, a tappet body portion which is formed of a roller holding portion and a slide portion and a roller. The structures, functions and the like of the tappet structural body are explained in detail in the second embodiment described later in conjunction with FIG. 7(*a*) to FIG. 7(*b*), FIG. 8(*a*) to FIG. 8(*b*), and FIG. 9(*a*) to FIG. 9(*b*).

(6) Cam

The cam 60 constitutes, as illustrated in FIG. 1 and FIG. 2, a main element for converting the rotational movement of the cam 60 into the vertical movement of the plunger 54 by way of the tappet structural body 6. Accordingly, it is preferable that the cam 60 is rotatably inserted and held in the shaft insertion hole 92*a* by way of a bearing body. Further, the cam 60 is configured to be rotated due to the driving of the cam shaft 3 which is connected with the diesel engine.

On an outer peripheral surface of the cam 60, it is preferable that two cam portions 3*a*, 3*b* which are positioned below the columnar spaces 92*b*, 92*c* of the pump housing 52 and are arranged in parallel in the axial direction with a predetermined distance therebetween are integrally mounted. Further, the respective cam portions 3*a*, 3*b* may preferably be arranged in parallel to each other while having a predetermined space with each other in a circumferential direction.

(7) Fuel Intake Valve and Fuel Discharge Valve

It is preferable that a fuel intake valve and a fuel discharge valve respectively include a valve body and a valve element which has a flange portion on a distal end thereof and it is preferable that the fuel intake valve 73 and the fuel discharge valve 79 are arranged as shown in FIG. 2.

(8) Fuel Lubrication System

Further, although a lubrication system of the fuel supply pump is not particularly limited, it is preferable to adopt a fuel lubricant system which uses a portion of the fuel oil as a lubrication component (lubrication fuel).

The reason is that with the use of the fuel for lubricating the cam chambers and the like, in supplying the fuel into the common rail under pressure by pressurizing the fuel, even when the portion of the fuel for lubricating the cam chamber or the like is mixed into the fuel which is supplied to the common rail under pressure, since these fuels have the same component, there is no possibility that an additive agent or the like which is contained in the lubricant is mixed into the fuel which is supplied to the common rail under pressure as in a case in which the lubricant is used for lubricating the cam chamber or the like. Accordingly, the possibility that the exhaust gas purifying property is lowered can be reduced.

2. Booster-Type Accumulator Fuel Injection Device

Further, the fuel supply pump of the first embodiment may, for example, preferably be a portion of the booster-type accumulator fuel injection device having the following constitution.

That is, as illustrated in FIG. 3, the booster-type accumulator fuel injection device may preferably be constituted of a fuel tank 102, a feed pump (a low-pressure pump) 104 for supplying the fuel to the fuel tank 102, a fuel supply pump (high-pressure pump) 103, a common rail 106 which constitutes an accumulator for accumulating the fuel supplied from the fuel supply pump 103 under pressure, a booster device (a booster piston) 108 for further pressurizing the fuel which is accumulated by the common rail 106 and a fuel injection device 110.

(1) Fuel Tank, Feed Pump and Fuel Supply Pump

A volume and the configuration of the fuel tank 102 illustrated in FIG. 3 may, for example, preferably be determined by taking into consideration a fact that the fuel supply pump of this embodiment can circulate the fuel at a flow rate of a unit time of approximately 500 to 1500 litter/hour.

Further, the feed pump 104 is, as shown in FIG. 3, provided for feeding the fuel (light oil) in the inside of the fuel tank 102 under pressure to the fuel supply pump 103, and a filter 105 may preferably be interposed between the feed pump 104 and the fuel supply pump 103. Further, it is preferable that the feed pump 104, although constituting one example, has the gear pump structure, is mounted on an end portion of a cam, and is driven by way of the driving of gears in a state that the feed pump 104 is directly connected with a cam shaft or the feed pump 104 is driven by way of a suitable gear ratio.

Further, it is preferable that the fuel which is fed from the feed pump 104 under pressure by way of the filter 105 is supplied to the fuel supply pump 103 further by way of a proportional control valve 120 which performs an injection quantity control.

Further, it is preferable that the fuel supplied from the feed pump 104 is, in addition to the supply of the fuel under pressure to the proportional control valve 120 and the fuel supply pump 103, made to return to the fuel tank 102 by way of an overflow valve (OFV) which is arranged parallel to the proportional control valve 120. Further, it is preferable that a portion of the fuel is supplied under pressure to the cam chamber of the fuel supply pump 103 by way of an orifice mounted on the overflow valve and is used as the fuel lubricant for the cam chamber.

(2) Common Rail

Further, the constitution of the common rail 106 is not particularly limited and the known constitution may be used. For example, as shown in FIG. 3, it is preferable that a plurality of injectors (injection valves) 110 are connected to the common rail 106, and the fuel which is accumulated at a high pressure in the common rail 106 is injected to the inside of internal combustion engines (not shown in the drawing) from the respective injectors 110.

The reason is that due to such a constitution, it is possible to inject the fuel into the engine by way of the injector 110 at an injection pressure which conforms to a rotational speed in a state that the injection pressure is not influenced by the fluctuation of the rotational speed of the engine. Further, the conventional injection pump system has a drawback that the injection pressure is changed tracing the engine rotational speed.

Further, a pressure detector 117 is connected to a side end of the common rail 106. It is preferable to transmit a pressure detection signal obtained by the pressure detector 117 to an electrical controlling unit (ECU). That is, it is preferable that the ECU, upon receiving the pressure detection signal from the pressure detector 117 controls an electromagnetic control valve (not shown in the drawing) and controls the driving of the proportional control valve in response to the detected pressure.

(3) Booster Device

Figure 4:
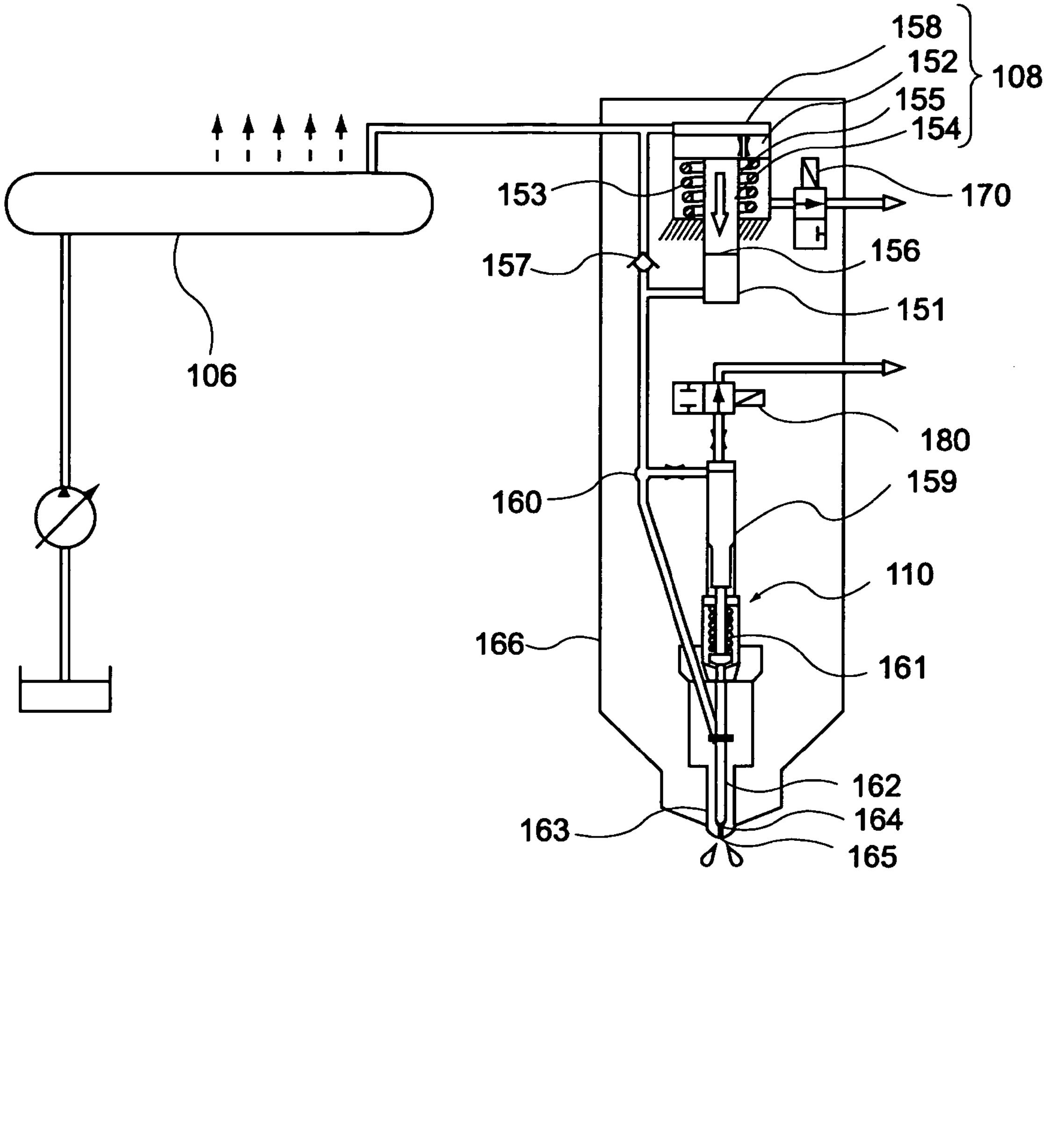
FIG. 4 is a view which serves to explain the structure of the booster-type accumulator fuel injection device.

Further, it is preferable that the booster device includes, as illustrated in FIG. 4, a cylinder 155, a mechanical piston (a booster piston) 154, a pressure receiving chamber 158, an electromagnetic valve 170 and a circulation passage 157, wherein the mechanical piston 154 includes a pressure receiving portion 152 having a relatively large area and a pressurizing portion 156 having a relatively small area respectively.

That is, the mechanical piston 154 which is housed in the cylinder 155 is moved by being pushed by the fuel which has the common rail pressure in the pressure receiving portion 152, and the fuel having the common rail pressure of the pressure receiving chamber 158, for example, the pressure of approximately 25 to 100 MPa is further pressurized by the pressurizing portion 156 having the relatively small area thus setting the pressure of the fuel to a value which falls within a range of 150 MPa to 300 MPa.

Further, although a large quantity of fuel having the common rail pressure is used for pressurizing the mechanical piston 154, it is preferable that the fuel is made to return to a fuel inlet of the high-pressure pump by way of an electromagnetic valve 170 after pressurizing. That is, as shown in FIG. 3, it is preferable that the most of fuel having the common rail pressure is, after being used for pressurizing the mechanical piston 154, made to return to the fuel inlet of the high pressure pump 103 by way of a line 121, for example, and the fuel is again used for pressurizing the mechanical piston 154.

On the other hand, the fuel which has the pressure boosted by the pressurizing portion 156 is, as shown in FIG. 4, supplied to the fuel injection device (fuel injection nozzle) 163, is efficiently injected and burnt, and the fuel which flows out from an electromagnetic valve 180 of the fuel injection device is made to return to the fuel tank 102 by way of a line 123.

Accordingly, due to the provision of such a booster device, it is possible to effectively push the mechanical piston using the fuel having the common rail pressure at an arbitrary timing without excessively increasing the common rail.

Figure 5:
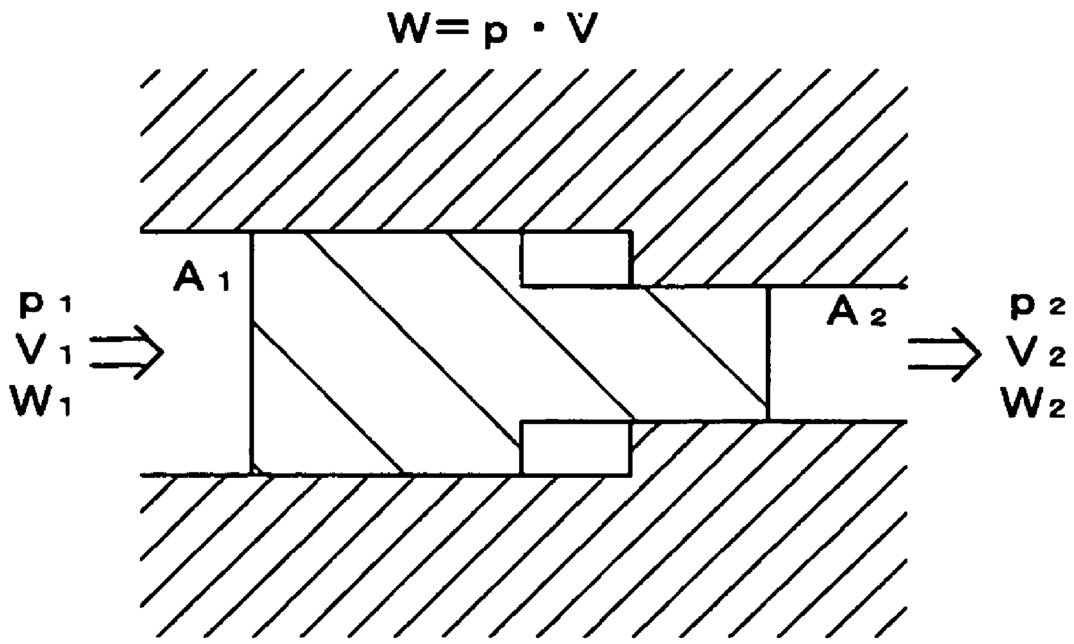
FIG. 5 is a view which conceptually shows a fuel boosting method in the booster-type accumulator fuel injection device.

That is, as shown in FIG. 5 which is a schematic view, according to the booster-type accumulator fuel injection device, by providing the pressure receiving portion having the relatively large area and the pressurizing portion having the relatively small area to the mechanical piston and by taking a stroke amount of the mechanical piston into consideration, it is possible to effectively increase the pressure of the fuel having the common rail pressure to a desired value with the least pressurizing loss.

To be more specific, it is possible to receive the fuel by the pressure receiving portion having the relatively large area and to convert the fuel from the common rail (pressure: p1, volume: V1, work load: W1) into the fuel of high pressure (pressure: p2, volume: V2, work load: W2) by the mechanical piston which includes the pressurizing portion having the relatively small area.

(4) Fuel Injection Device (4)-1 Basic Structure

Further, although the configuration of the fuel injection device (injector) 110 is not particularly limited, for example, as illustrated in FIG. 4, the fuel injection device includes a nozzle body 163 which is constituted of a seat surface 164 on which a needle valve element 162 is seated, and an injection hole 165 which is formed in the nozzle body 163 on the downstream side of a valve-element contact portion of the seat surface 164, wherein when the needle valve element 162 is lifted, the fuel which is supplied from the upstream side of the seat surface 164 is guided to the injection hole 165.

Further, such a fuel injection nozzle 166 may preferably be of an electromagnetic valve type which constantly biases the needle valve element 162 toward the seat surface 164 using a spring 161 or the like and opens or closes the needle valve element 162 in response to the changeover of energization/deenergization of a solenoid 180.

(4)-2 Injection Timing Chart

Figure 6:
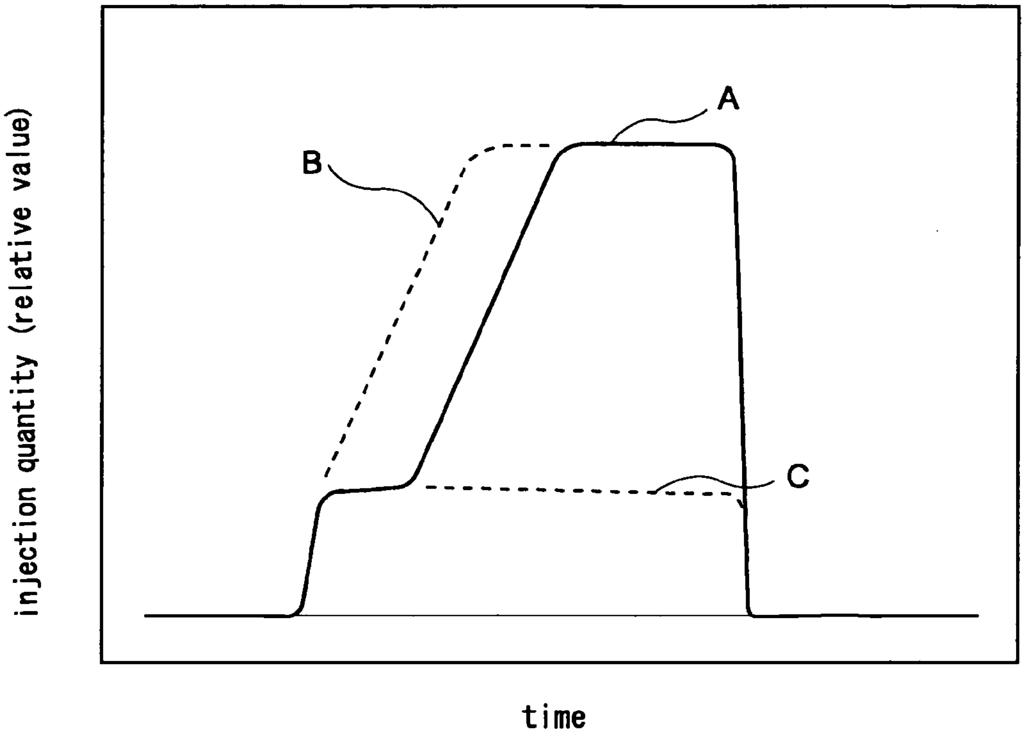
FIG. 6 is a view which serves to explain an injection timing chart of a high-pressure fuel.

Further, with respect to the injection timing chart of the high-pressure fuel, as illustrated in FIG. 6, it is preferable to adopt a fuel injection chart which possesses the injection state in two stages as indicated by a solid line A.

The reason is that it is possible to obtain the injection timing chart in two stages by combining the common rail pressure and the booster in the booster device (booster piston) and hence, the combustion efficiency of the fuel can be increased and the exhaust gas can be purified.

Further, according to the present invention, it is also preferable to provide the fuel injection timing chart indicated by a dotted line B due to the combination of the common rail pressure and the boosting timing in the booster device (booster piston) as shown in FIG. 6.

Here, when the booster device (booster piston) is not used, that is, in case of the conventional injection timing chart, there is provided an injection timing chart of one stage of low injection quantity as indicated by a dotted line C in FIG. 6.

Second Embodiment

Figure 7:
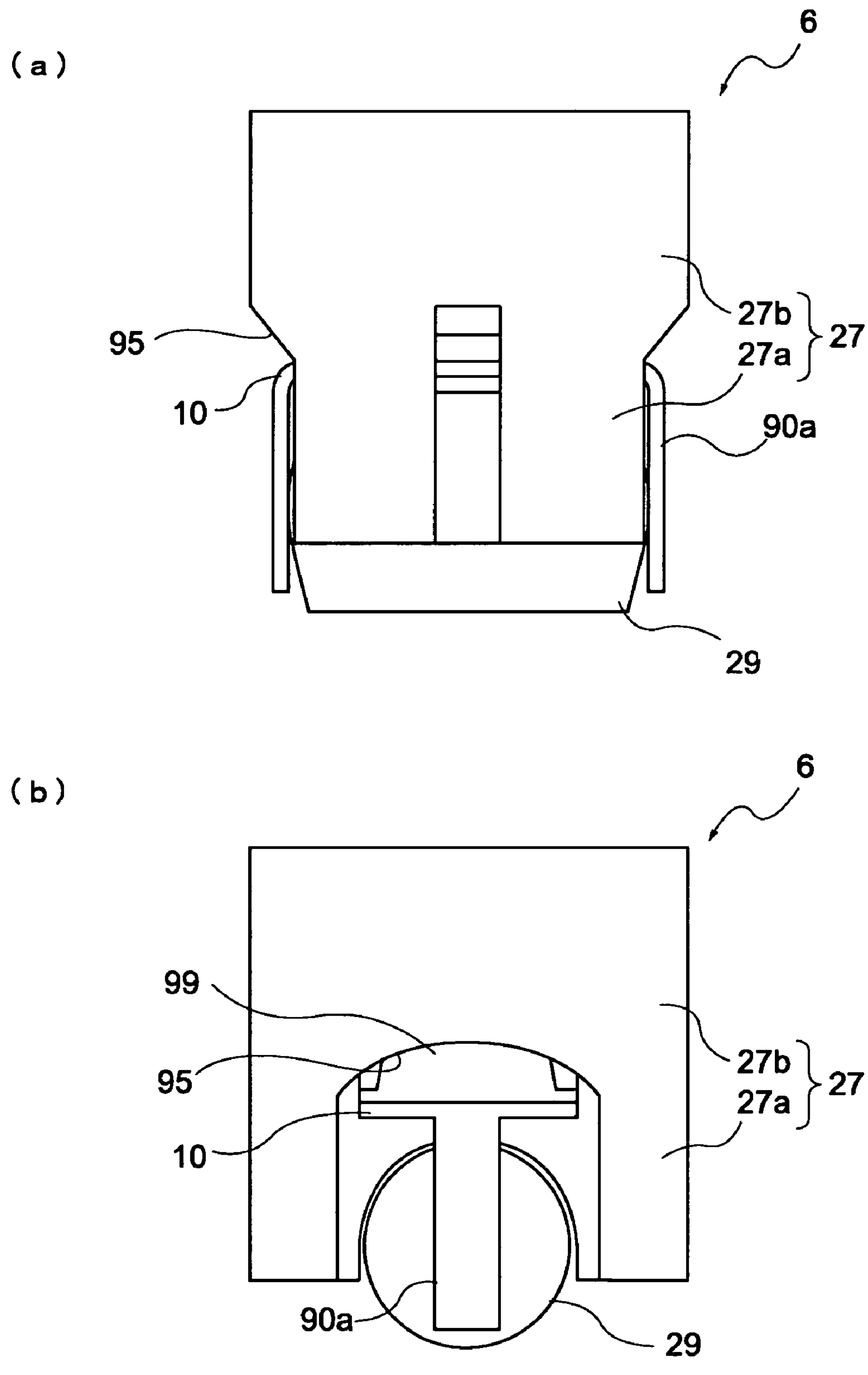
FIG. 7(*a*) and FIG. 7(*b*) are respectively side views of a tappet structural body of the present invention.
Figure 8:
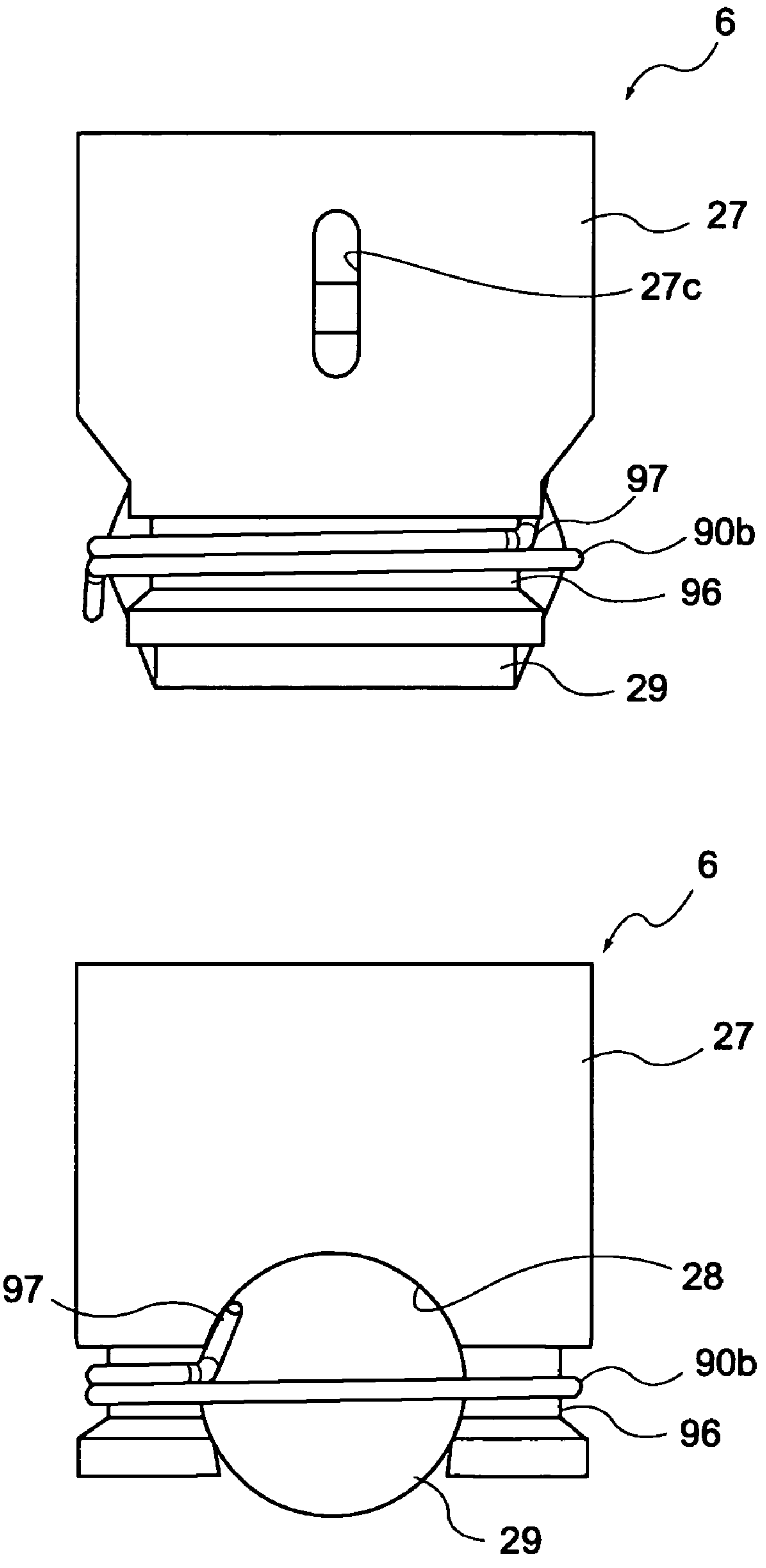
FIG. 8(*a*) and FIG. 8(*b*) are respectively side views of another tappet structural body of the present invention.
Figure 9:
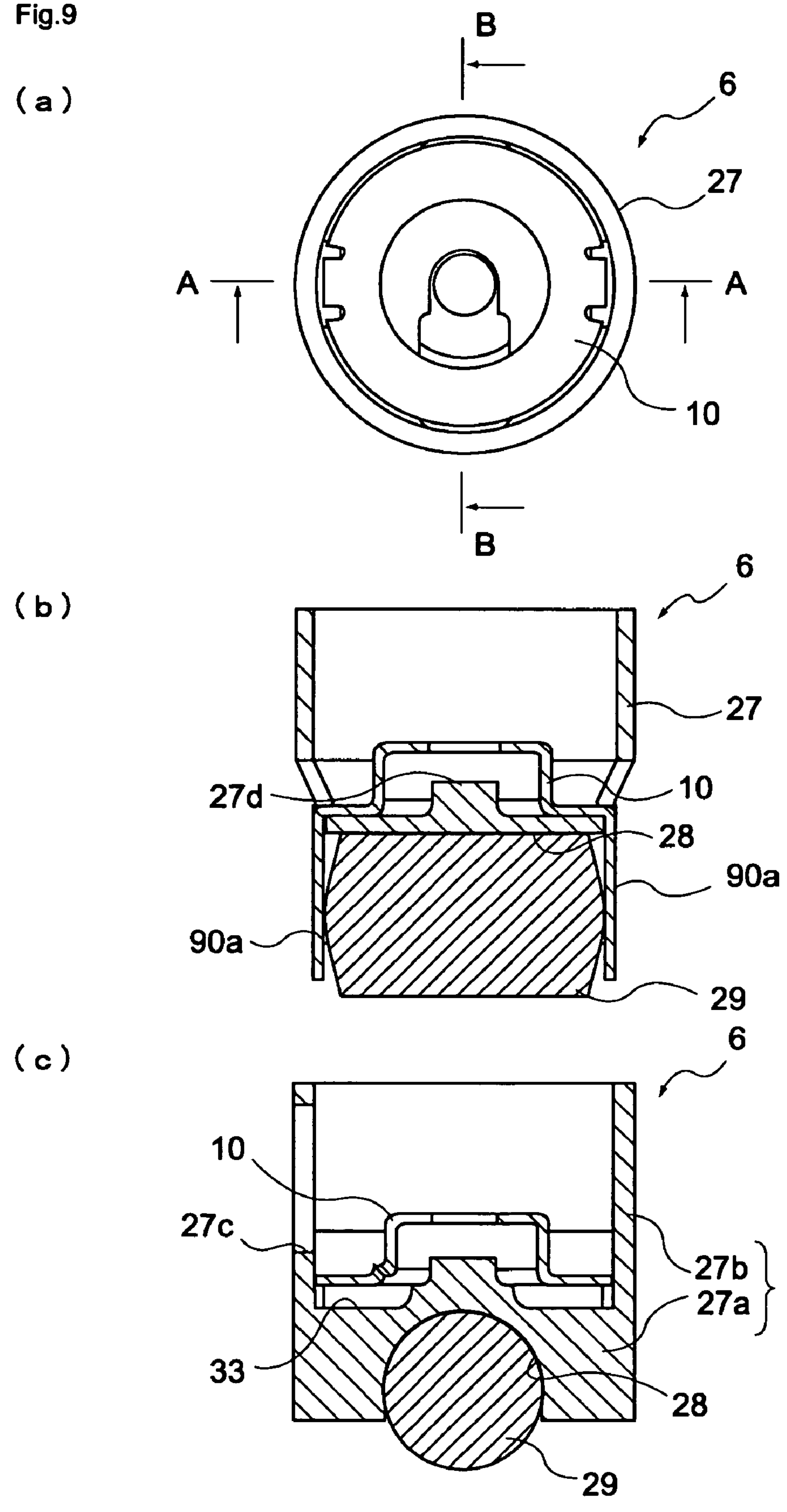
FIG. 9(*a*) to FIG. 9(*c*) are respectively views for explaining the tappet structural body.

The second embodiment is directed to the tappet structural body 6 which, as shown in FIG. 7(*a*) to FIG. 7(*b*), FIG. 8(*a*) to FIG. 8(*b*), and FIG. 9(*a*) to FIG. 9(*b*), includes the roller 29 and the tappet body portion 27 which accommodates the roller 29, the roller receiver 28 of the tappet body portion 27 is allowed to rotatably hold the roller 29 and the tappet structural body 6 includes a plate-like or wire-like restricting means 90 which restricts the movement of the roller 29 in the rotary axis direction.

Hereinafter, the basic structure of the tappet structural body 6 is specifically explained in conjunction with drawings with respect to the tappet body portion 27, the roller 29 and the restricting means 90 which are formed by dividing the tappet structural body 6 suitably.

1. Basic Structure

The tappet structural body 6 is, as shown in FIG. 7(*a*) to FIG. 7(*b*), FIG. 8(*a*) to FIG. 8(*b*) and FIG. 9(*a*) to FIG. 9(*b*), basically constituted of a spring seat 10, a tappet body portion 27 which is formed of a body portion 27*a* made of a block body and a cylindrical slide portion 27*b* which is extended from the body portion 27*a* and a roller 29. The tappet structural body 6 may preferably be constituted such that the tappet structural body 6 is elevated due to the rotational movement of the cam shaft 3 and the cam 60 which is contiguously formed with the cam shaft 3 as shown in FIG. 1.

Here, FIG. 9(*a*) is an upper plan view of the tappet structural body 6 shown in FIG. 7, FIG. 9(*b*) is a cross-sectional view taken along a line AA in FIG. 9(*a*), and FIG. 9(*c*) is a cross-sectional view taken along a line BB in FIG. 9(*a*).

2. Spring Seat

Figure 10:
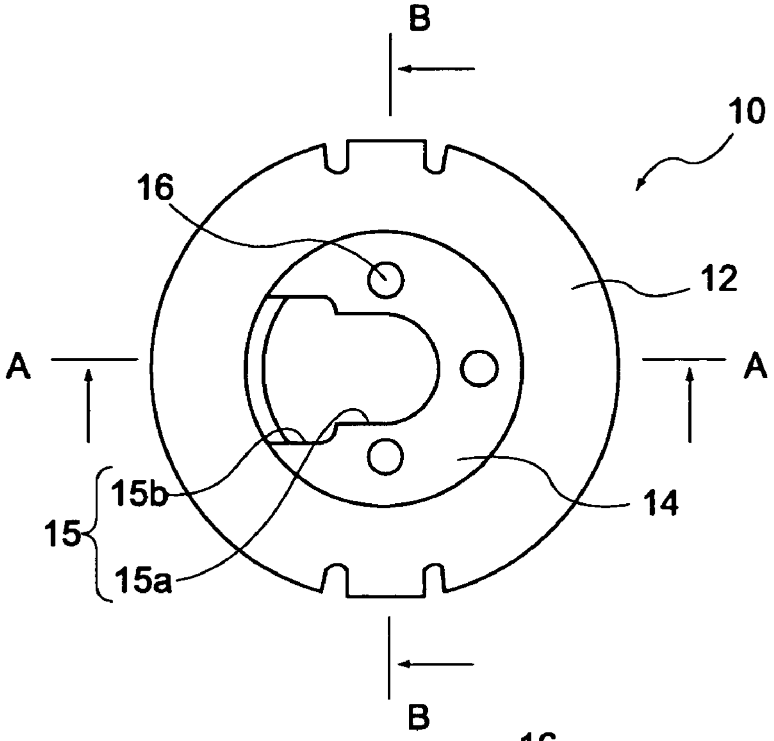
FIG. 10(*a*) to FIG. 10(*c*) are views for explaining one example of a plate-like restricting means which makes use of a spring seat.
Figure 10:
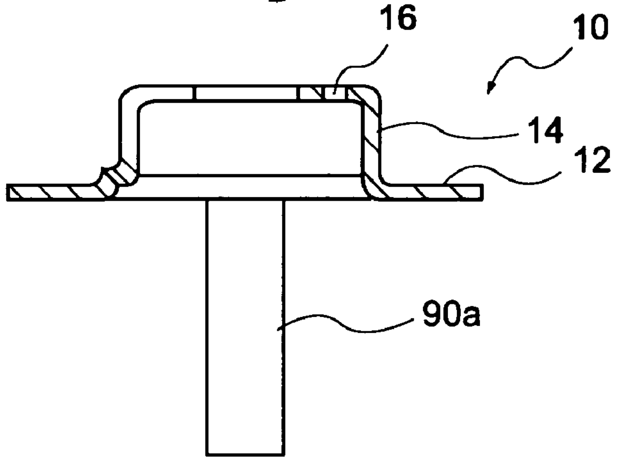
Figure 10:
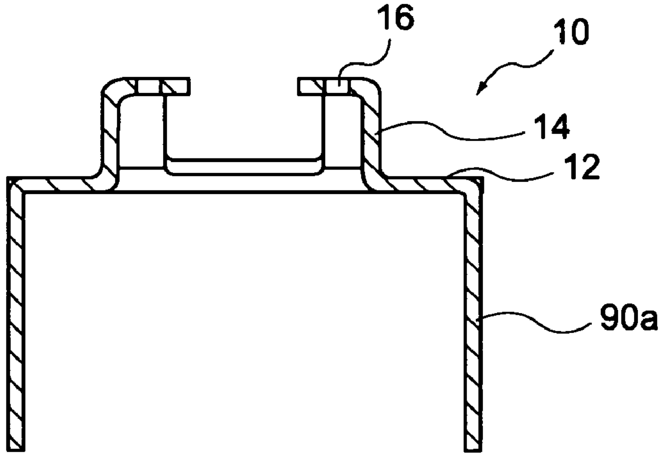

The spring seat is an element for holding a return spring which is used at the time of pulling down the plunger. The spring seat 10 may preferably include, as shown in FIG. 10(*a*), a spring holding portion 12 which serves to hold the return spring and a plunger mounting portion 14 with which the plunger is engaged.

3. Tappet Body Portion

Figure 11:
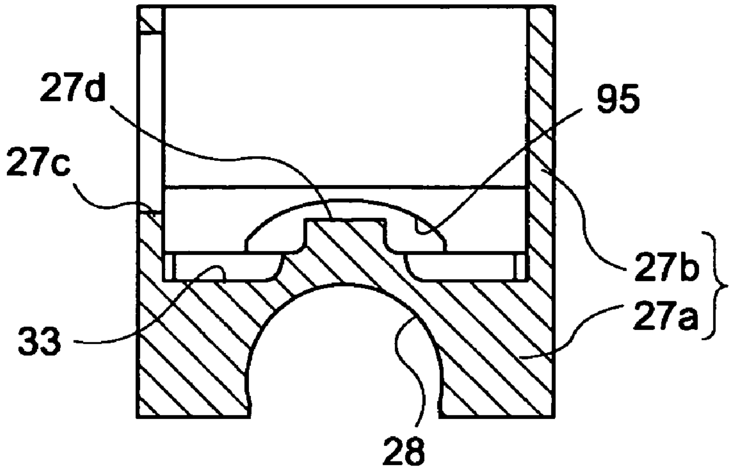
FIG. 11(*a*) to FIG. 11(*c*) are respectively views for explaining a tappet body portion.
Figure 11:
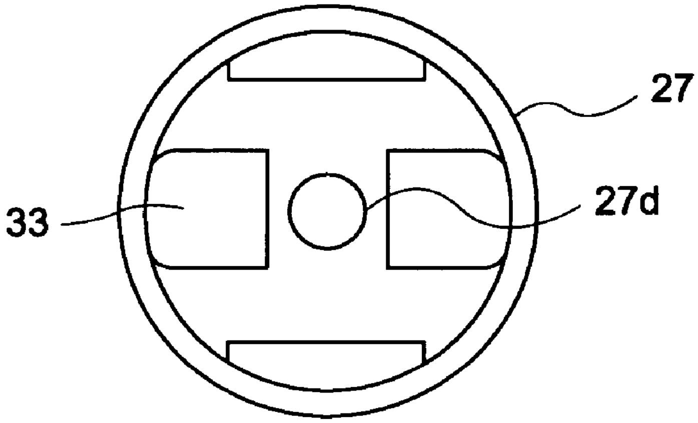
Figure 11:
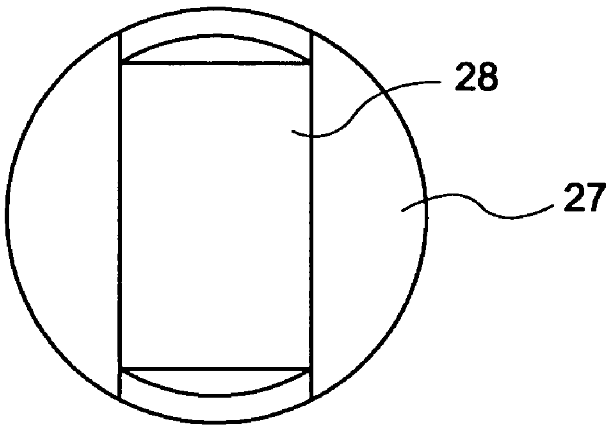

It is preferable that the tappet body portion is, as shown in FIG. 11(*a*) to FIG. 11(*c*), made of a bearing steel as a whole and is constituted of the body portion 27*a* made of the block body and the cylindrical slide portion 27*b* which extends upwardly from an end portion of the body portion 27*a*. That is, the tappet body portion may preferably be formed in a shape with a circular plane which has an outer peripheral surface which conforms to an inner peripheral surface of the columnar space of the pump housing. Further, in the inside of the cylindrical slide portion 27*b*, a space in which the spring seat and the plunger are inserted is formed.

Here, it is preferable that an opening portion (a slit portion) 27*c* which allows the insertion of a guide pin thereto is formed in the slide portion 27*b*, and the opening portion (the slit portion) 27*c* is formed as a passing hole which extends in the axial direction of the tappet body 27. The reason is that the tappet structural body 6 is, at the time of elevation and lowering, allowed to be elevated or lowered along an axis of the cylindrical space in combination with the guide pin and the opening portion 27*c* to prevent the displacement of the operation direction of the tappet structural body 6. Further, compared to a case in which a guide groove is formed in the pump housing, it is possible to lower a manufacturing cost of the fuel supply pump.

Further, a contact portion 27*d* which comes into contact with the plunger may preferably be formed on a center portion of an upper surface of the body portion 27*a* in a projecting manner.

Further, as shown in FIG. 11(*a*), a roller receiver 28 having an inner peripheral surface which conforms to an outer peripheral surface of the roller 29 is formed on the body portion 27*a*. Further, it is preferable that, by taking diameters, widths and the like of the roller receiver 28 and the roller 29 into consideration, as shown in FIG. 7(*b*), the roller 29 can be inserted from sides or a lower side of the roller receiver 28 and the roller 29 is rotatably supported on the roller receiver 28.

4. Passing Hole and Guide Passage

Figure 12:
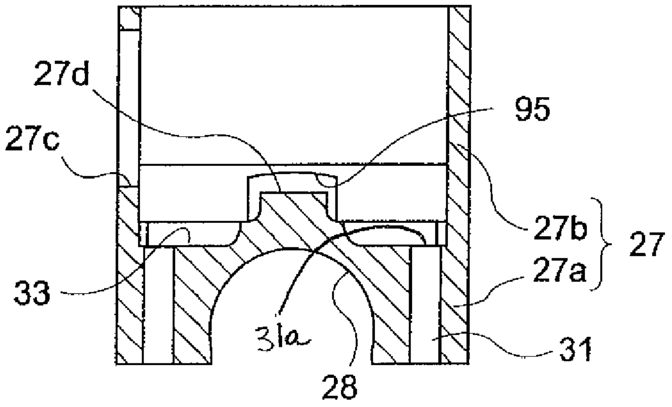
FIG. 12(*a*) to FIG. 12(*c*) are views for explaining a passing hole and a guide passage of the tappet body portion.
Figure 12:
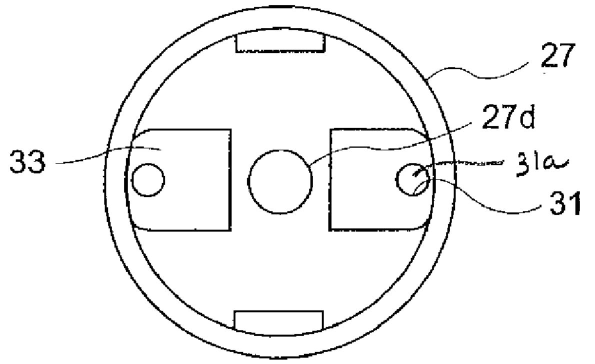
Figure 12:
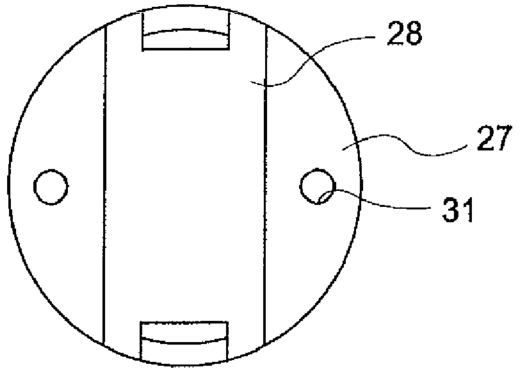

The tappet structural body may preferably be constituted such that the lubricant or the lubrication fuel can freely reciprocate between the spring holding portion and the cam chamber. For example, as illustrated in FIG. 12(*a*) to FIG. 12(*c*), it is preferable to form a passing hole 31 in the inside of the tappet body portion 27*a* and a guide passage 33 at a portion including an upper-surface-side opening portion 31*a* of the passing hole 31. Further, as illustrated in FIG. 10(*a*) and FIG. 10(*b*), it is also preferable to form a passing hole 16 in the spring seat 10.

The reason is that by forming such passing hole and guide passage, it is possible to allow the lubricant or the lubrication fuel to reciprocate readily between the spring holding chamber and the cam chamber. Accordingly, it is possible to reduce a possibility that the tappet structural body impedes the high-speed driving of the cam and the plunger.

Here, as described later, when the restricting means is constituted of a plate-like restricting means which is formed by extending a portion of a peripheral portion of the spring seat, as shown in FIG. 7(*b*), an insertion hole 95 which allows the insertion of the plate-like restricting means 90*a* is formed in the tappet body portion 27. Accordingly, by forming a gap 99 around the plate-like restricting means 90*a* in the insertion hole 95, it is possible to allow the insertion hole 95 to function also as the passing hole which allows the reciprocation of the lubricant or the like therethrough.

5. Roller

Figure 13:
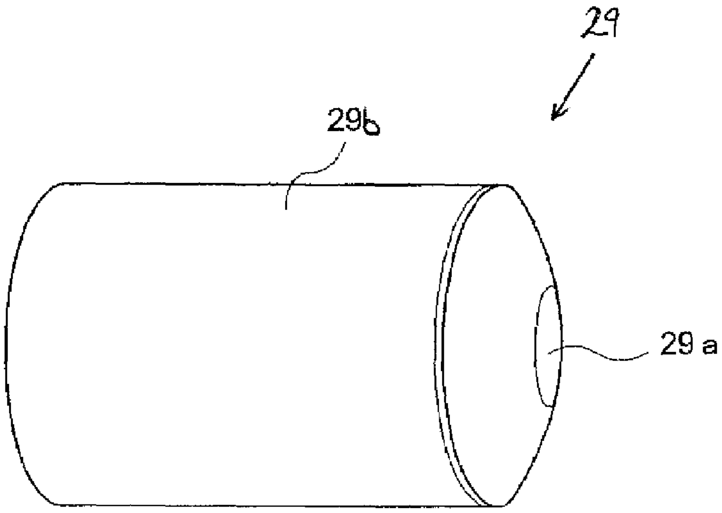
FIG. 13 is a view for explaining a roller in the tappet structural body.
Figure 13:
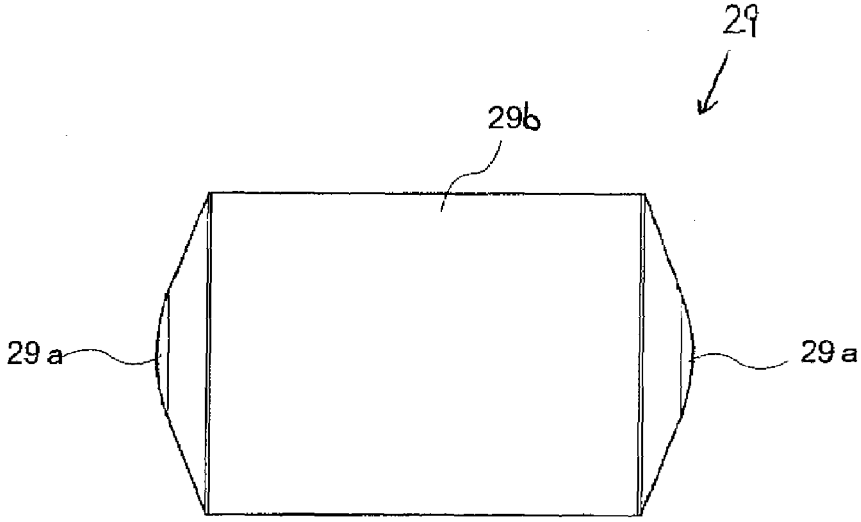

The roller 29 may preferably be, as shown in FIG. 13(*a*) to FIG. 13(*b*), configured as an integral body of a pin portion 29*a* and a roller portion 29*b*. The reason is that, compared to a case in which the pin portion (roller pin) 29*a* and the roller portion (roller) 29*b* are constituted as a combination of separate parts, a load from the roller 29 is received by the tappet body portion as a whole and hence, the tappet structural body can withstand a higher load. Further, it is no more necessary to take the resistance which is generated between the roller pin 29*a* and the roller 29*b* into consideration and hence, it is possible to rotate the roller 29 at a higher speed. Further, it is no more necessary to form a hole for inserting the roller pin 29*a* in the inside of the roller 29 and hence, the strength of the roller 29 can be enhanced.

Further, it is preferable that the roller 29 is inserted into the roller receiver 28 from sideward and is rotatably supported on the roller receiver 28, wherein carburizing treatment, for example, a carbon coating film is applied to a whole surface of the roller receiver 28. Further, the roller 29 may preferably be configured to receive a rotational force of the cam which is contiguously connected with the cam shaft. The reason is that it is possible to control a slide state between the roller 29 and the roller receiver 28 by the carburizing treatment which is applied to the roller receiver 28 and hence, the rotational force of the cam can be transmitted to the roller receiver 28 which constitutes a portion of the tappet body portion 27 by way of the roller 29 and, eventually, the rotational movement can be efficiently converted into the reciprocating movement of the plunger.

Accordingly, the tappet structure body which has such a constitution can repeatedly reciprocate for a long period at a high speed in response to the rotation of the cam which is contiguously connected to the cam shaft.

6. Restricting Means (1) Summary

The tappet structural body of the present invention is characterized in that the tappet structural body includes the plate-like or wire-like restricting means which restricts the movement of the roller in the rotary axis direction. That is, in mounting the tappet structural body in the inside of a pump housing and rotating the pump at a high speed, even when the tappet structural body is vigorously vertically moved in the inside of the pump housing, the restricting means can prevent an end portion of the roller from coming into contact with an inner peripheral surface of the pump housing. Further, with the use of the plate-like or wire-like restricting means which can be formed in the simple constitution, it is possible to easily assemble the tappet structural body and the fuel supply pump.

Such restricting means is not particularly limited so long as the restricting means can fix the relative position of the roller with respect to the rotary axis direction and hence, the restricting means can be formed in various configurations. However, to prevent the restricting means per se from being damaged by a frictional force attributed to the rotation of the roller, it is preferable to control the movement of the roller 29 in the rotary axis direction by adopting the constitution shown in FIG. 13(*a*) in which pin portions 29*a* at both ends of the roller 29 are sandwiched from both sides.

Further, it is preferable to constitute the restricting means such that, when the tappet structural body is viewed in a plan view, the restricting means does not project from an outer periphery of the tappet structural body. That is, due to such constitution, it is possible to prevent the inner peripheral surface of the pump housing from being damaged by the restricting means per se.

(2) Plate-Like Restricting Means

The restricting means 90 may, as shown in FIG. 10(*a*) to FIG. 10(*c*), preferably be constituted of a plate-like member which is formed by extending a portion of a peripheral portion of the spring seat 10 in the direction toward the end of the roller, that is, a plate-like restricting means 90*a*. The reason is that the predetermined restricting means can be easily provided without increasing the number of parts which constitute the tappet structural body.

Here, FIG. 10(*a*) is a plan view of the spring seat 10 which possesses the plate-like restricting means 90*a*, FIG. 10(*b*) is a cross-sectional view taken along a line AA in FIG. 10(*a*), and FIG. 10(*c*) is a cross-sectional view taken along a line BB in FIG. 10(*a*). Further, FIG. 7(*a*) and FIG. 7(*b*) show one example of the tappet structural body 6 which possesses the plate-like restricting means 90*a* which is constituted by extending one portion of the peripheral portion of the spring seat 10 in the direction toward the end of the roller.

Figure 14:
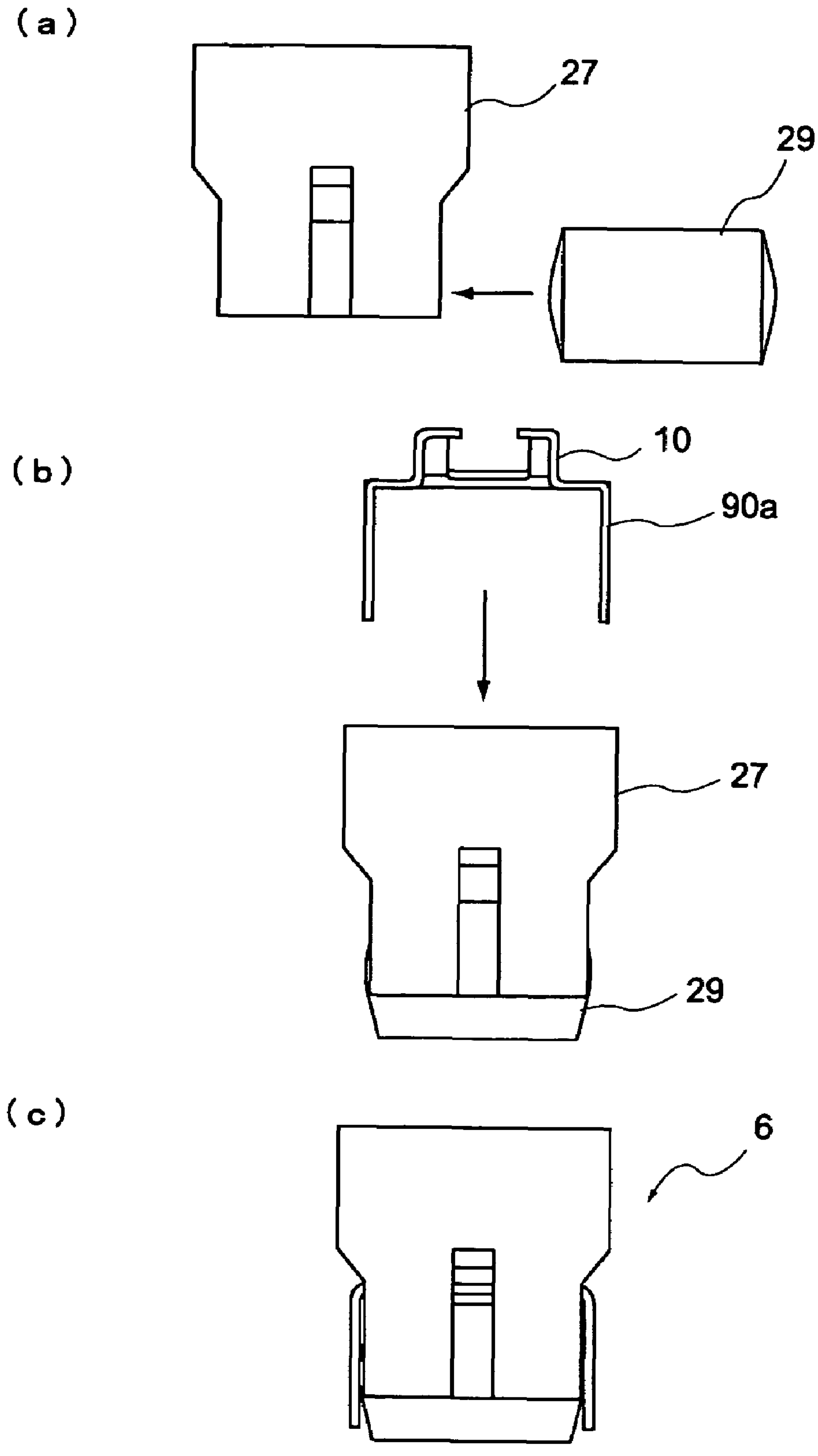
FIG. 14(*a*) to FIG. 14(*c*) are views which serve to explain an assembling method of the tappet structural body which has a plate-like restricting means which makes use of a spring seat.

To be more specific, as shown in FIG. 14(*a*), the roller 29 is inserted into the roller receiver 28 of the tappet body portion 27 and, thereafter, as shown in FIG. 14(*b*), the spring seat 10 which forms a pair of plate-like restricting means 90*a* which are formed by extending the peripheral portion of the spring seat 10 is mounted from above the tappet body portion 27. Due to such a constitution, as shown in FIG. 14(*c*), the tappet structural body assumes a state in which the roller 29 is sandwiched by the plate-like restricting means 90*a* and hence, the movement of the roller 29 in the rotary axis direction is restricted. Accordingly, with the provision of such restricting means, it is possible to easily assemble the tappet structural body provided with the predetermined restricting means and it is possible to surely prevent the movement of the roller in the rotary axis direction.

Further, when the restricting means is constituted by extending the portion of the peripheral portion of the spring seat, as shown in FIG. 7(*b*), it is possible to allow the insertion hole 95 into which the plate-like restricting means 90*a* is inserted in the tappet body portion 27 to function as a passing hole through which the lubricant or the lubrication fuel passes. That is, by forming a gap 99 around the plate-like restricting means 90*a* in the insertion hole 95 in a state that the plate-like restricting means 90*a* is inserted into the insertion hole 95 formed in the tappet body portion 27, it is possible to allow the lubricant or the like to easily reciprocate between the spring holding chamber and the cam chamber by way of the gap 99. Accordingly, it is no more necessary to form the above-mentioned passing hole in the tappet body portion or the spring seat and hence, the provision of the restricting means which is constituted by extending the portion of the peripheral portion of the spring seat is preferable.

Figure 15:
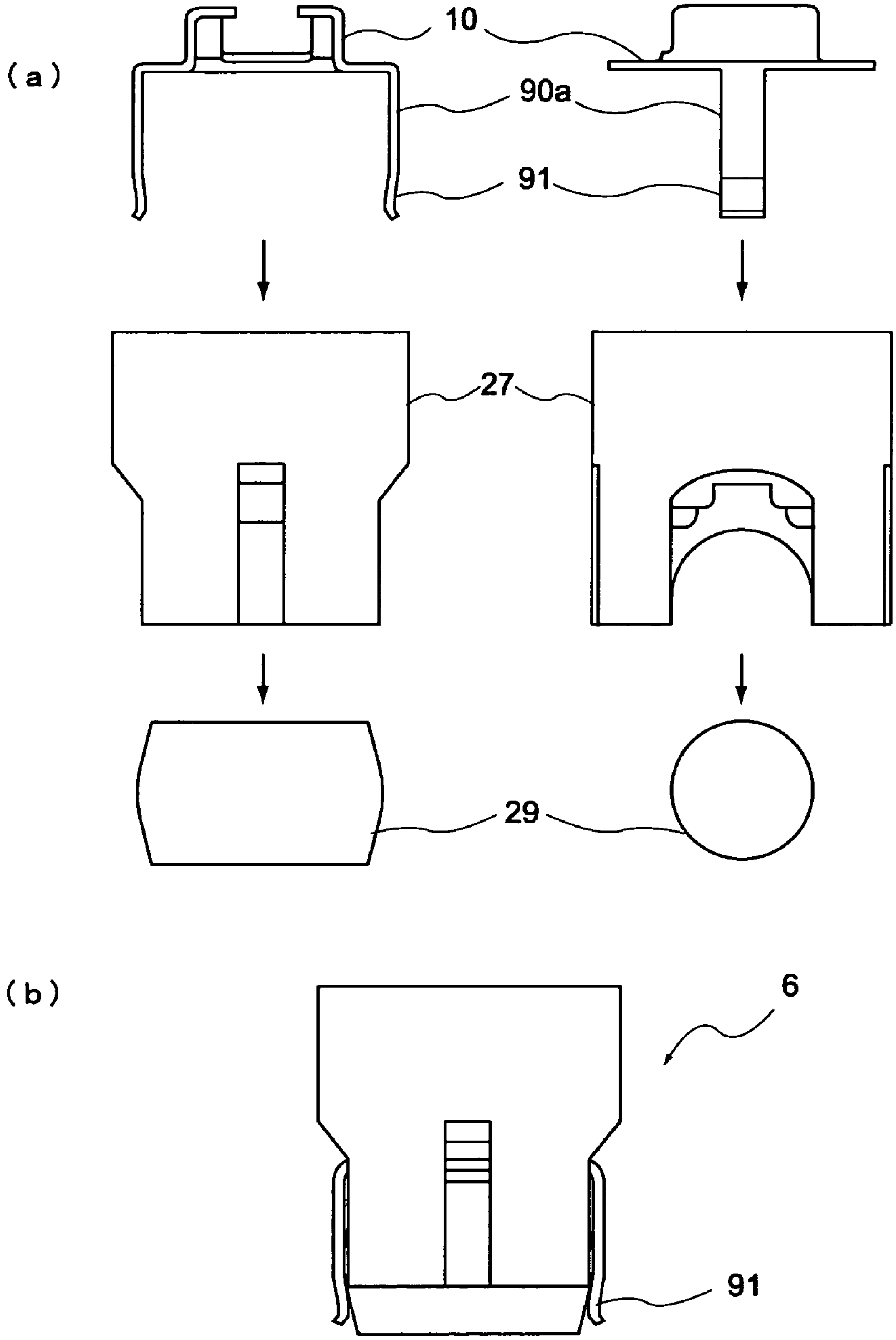
FIG. 15(*a*) to FIG. 15(*b*) are views which serve to explain one example of a tappet structural body which has a plate-like restricting means with a bent portion.

Further, in constituting the restricting means using the above-mentioned plate-like restricting means, as shown in FIG. 15(*a*) to FIG. 15(*b*), it is preferable to form bent portions 91 for receiving the roller 29 in the vicinity of end portions of the plate-like restricting means 90*a*.

The reason is that such a provision not only facilitates the assembling of the tappet body portion 27, the roller 29 and the spring seat 10 but also can enhance the integrity of the roller 29, the tappet body portion 27 and the spring seat 10.

To be more specific, in case of a spring seat which is provided with restricting means with no such bent portions, the roller is neither supported on nor received by the spring seat and, as shown in FIG. 11, a lower-side width of the roller receiver 28 of the tappet body portion 27 is made slightly shorter than a diameter of the roller 29 so as to support the roller 29. In such a case, at the time of taking out the tappet structural body from the pump housing, the spring seat is taken out and, thereafter, the tappet body portion and the roller are taken out. Further, in assembling the tappet structural body, as shown in FIG. 14(*a*), it is necessary to mount the roller 29 on the tappet body portion 27 from sideward and hence, there may be a possibility that the mounting operation becomes cumbersome.

However, by forming the predetermined bent portions on the plate-like members which constitute the restricting means, for example, at the time of taking out the tappet structural body from the pump housing, by pulling out the spring seat or the plunger which is engaged with the spring seat, it is possible to easily take out the tappet structural body. Further, in assembling the tappet structural body, as shown in FIG. 15(*a*), by only assembling the spring seat 10, the tappet body portion 27 and the roller 29 in the vertical direction, it is possible to easily assemble the tappet structural body.

Here, FIG. 15(*a*) is a view in which the assembling method of the spring seat 10, the tappet body portion 27 and the roller 29 is viewed from two directions which are orthogonal to each other, and FIG. 15(*b*) is a view showing the tappet structural body 6 after assembling including the plate-like restricting means provided with the bent portion.

(3) Wire-Like Restricting Means

Figure 16:
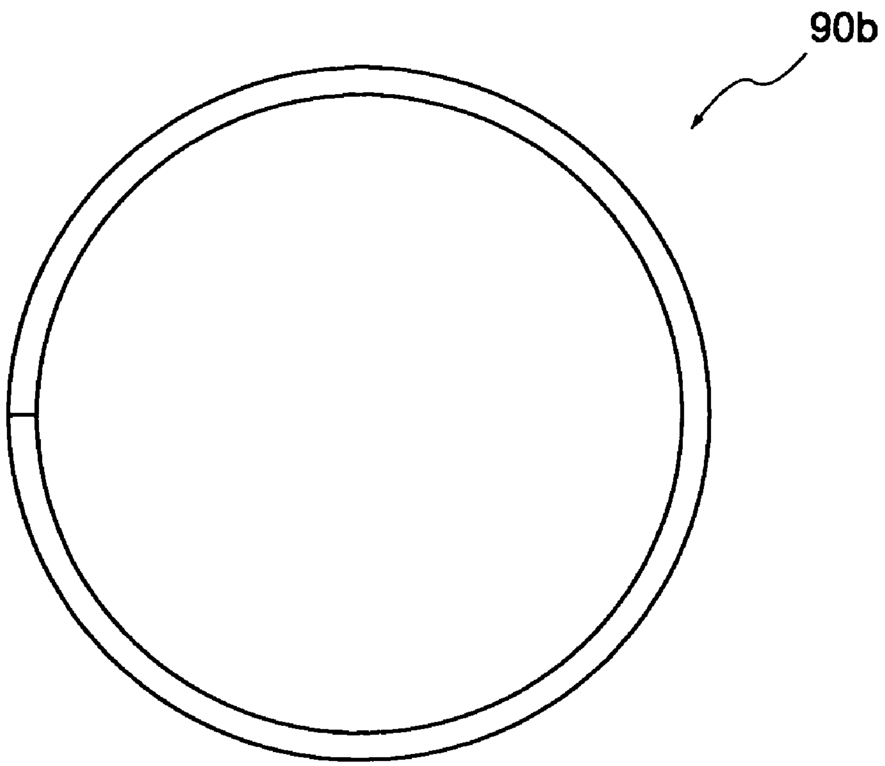
FIG. 16(*a*) to FIG. 16(*b*) are views which serve to explain one example of a wire-like restricting means which uses a spring member.
Figure 16:

Further, the restricting means may be preferably constituted such that, as shown in FIG. 16(*a*) to FIG. 16(*b*), the restricting means is formed of a wire-like restricting means 90*b* and the wire-like restricting means 90*b* is wound around a groove portion 96 of the tappet body portion 27. The reason is that, by covering end portions of the roller with the wire-like restricting means, it is possible to prevent the end portions of the roller from being exposed to the outside.

Figure 17:
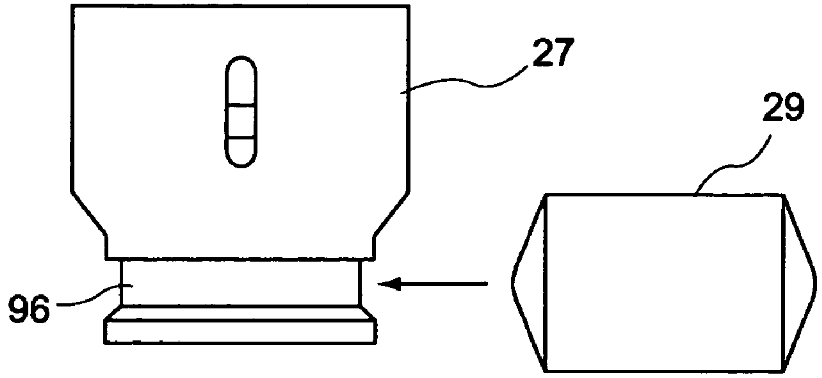
FIG. 17(*a*) to FIG. 17(*c*) are views which serve to explain an assembling method of a tappet structural body which has a wire-like restricting means using a spring member.
Figure 17:
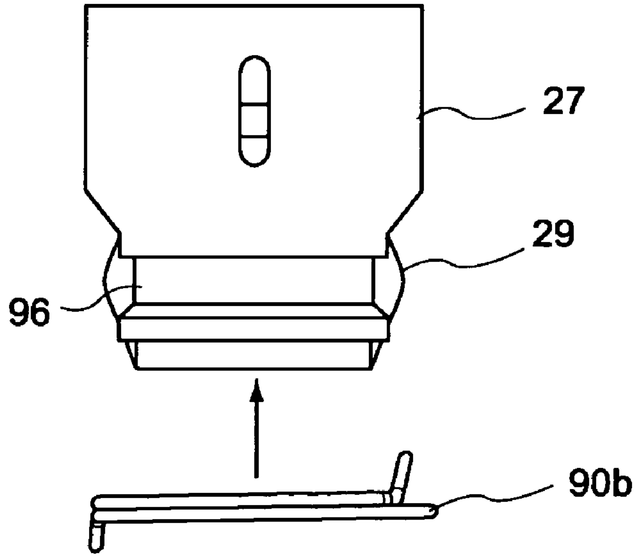
Figure 17:
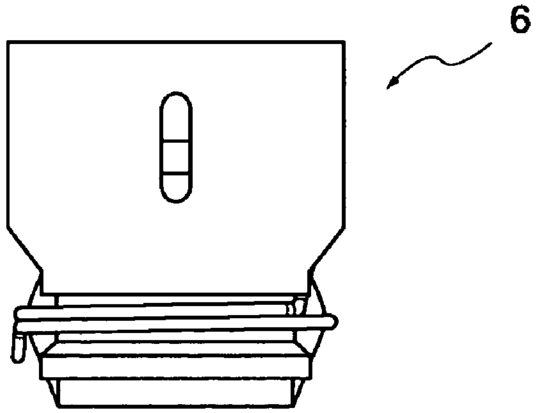

To be more specific, as shown in FIG. 17(*a*), the roller 29 is inserted into the roller receiver 28 of the tappet body portion 27 and, thereafter, as shown in FIG. 17(*b*), the spring member 90*b* is mounted in the groove portion 96 which is formed in the tappet body portion 27 thus fixing the position of the spring member 90*b*. Due to such a constitution, as shown in FIG. 17(*c*), the movement of the roller 29 in the rotary axis direction is restricted by the spring member 90*b*.

Accordingly, even when the spring member is used as the restricting member, it is possible to surely restrict the movement of the roller in the rotary axis direction and it is possible to easily assemble the tappet structural body provided with the predetermined restricting means.

As such a wire-like restricting means, spring members formed of carbon fibers or aramid fibers having a high strength, a piano wire or a hard steel wire, a stainless steel wire, a titanium wire or the like can be used. Among these spring members, it is preferable to use the spring member made of a piano wire. The reason is that with the use of the spring member made of the piano wire, it is possible to enhance the durability and the size stability of the wire-like restricting means.

Figure 18:
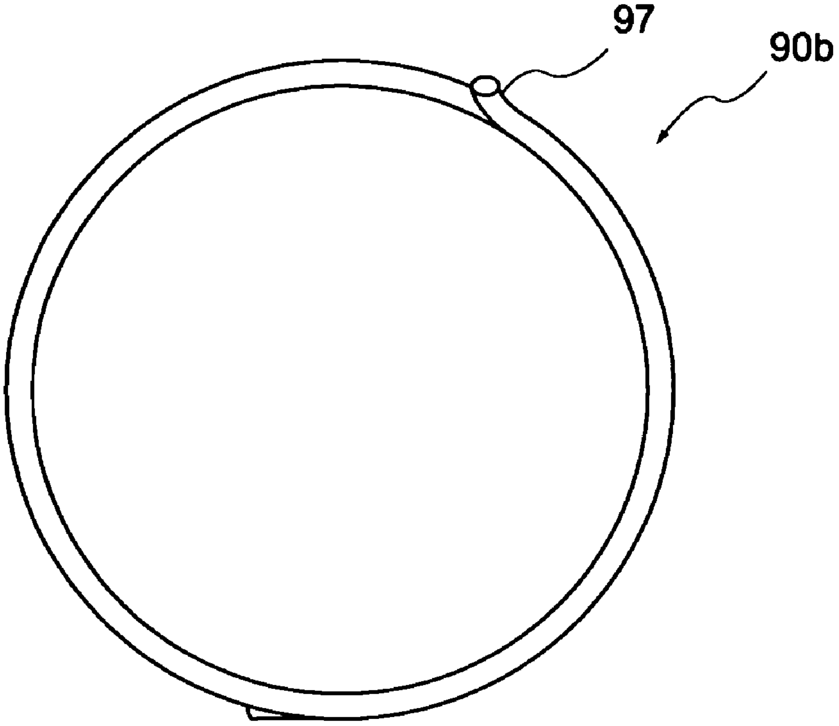
FIG. 18(*a*) to FIG. 18(*b*) are views which serve to explain a pawl portion of a spring member which constitutes a wire-like restricting member.
Figure 18:
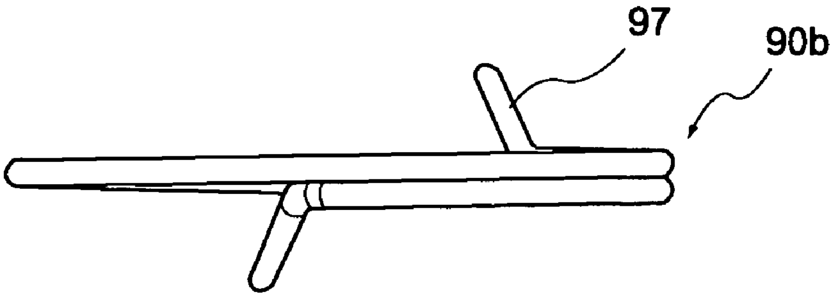
Figure 19:
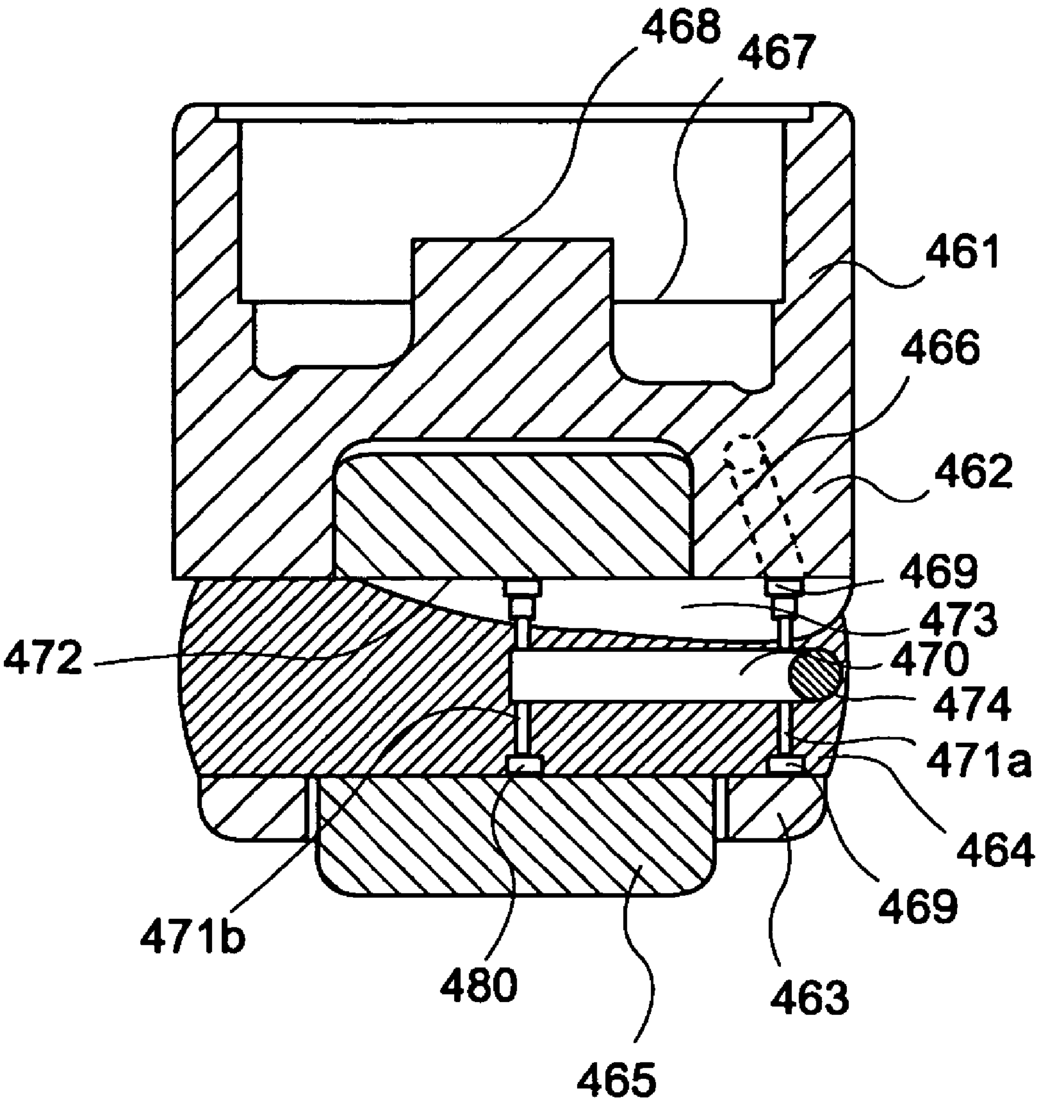
FIG. 19 is a view which serves to explain a conventional tappet structural body.

Further, when the wire member made of the spring member or the like is used as the restricting means, as shown in FIG. 18(*a*) to FIG. 18(*b*), it is preferable to form predetermined pawl portions 97 on end portions of the spring member 90*b*. That is, in mounting the spring member 90*b* on the tappet body portion 27, as shown in FIG. 8(*a*) to FIG. 8(*b*), by fixing the spring member 90*b* such that the pawl portions 97 are engaged with peripheries of the roller receiver 28, even when the pump is rotated at a high speed and hence, the tappet structural body is vigorously vertically moved, it is possible to prevent the spring member from being expanded forcibly by the roller. Accordingly, it is possible to prevent a phenomenon that an inner peripheral surface of the pump housing is damaged by the spring member which constitutes the means which restricts the movement of the roller in the rotary axis direction.

INDUSTRIAL APPLICABILITY

According to the fuel supply pump of the present invention, with the use of the tappet structural body which includes the predetermined restricting means for restricting the movement of the roller in the rotary axis direction, even when the pump is rotated at a high speed, it is possible to prevent the phenomenon that the inner peripheral surface of the pump housing is damaged by the roller and the end portions of the roller pin. Accordingly, the fuel supply pump of the present invention can be preferably used as the fuel supply pump which is used in the booster-type accumulator fuel injection device.

Further, the tappet structural body of the present invention includes the predetermined restricting means which restricts the movement of the roller in the rotary axis direction and hence, it is possible to prevent the phenomenon that the roller and the end portions of the roller pin come into contact with the inner peripheral surface of the pump housing. Accordingly, even when the tappet structural body of the present invention is used in the fuel supply pump of the accumulator fuel injection device which increases the pressure of a large flow rate of fuel using the piston together with the common rail, the occurrence of damages on the inner peripheral surface of the pump housing can be reduced thus enabling the high-speed driving of the pump for a long time.

Explanation of Symbols

3: cam shaft
6: tappet structural body
10: spring seat
12: spring holding portion
14: plunger mounting portion
16: passing hole (communicating portion)
27: tappet body portion
27*a*: body portion
27*b*: slide portion
28: roller receiver
29: roller
29*a*: roller portion
29*b*: pin portion
31: passing hole (communicating portion)
33: guide passage
50: fuel supply pump
52: pump housing
53: plunger barrel (cylinder)
54: plunger
60: cam
73: fuel supply valve
74: fuel compression chamber
90: restricting means
90*a*: plate-like restricting means (extended portion of spring seat)
90*b*: wire-like restricting means (spring member)
95: insertion hole
96: groove portion
97: pawl portion
99: gap
100: booster type accumulator fuel injection device
102: fuel tank
103: fuel supply pump (high-pressure pump)
104: feed pump (low-pressure pump)
106: common rail
108: piston booster device (booster piston)
110: injector
120: proportion control valves
152: pressure receiving portion
154: mechanical piston
155: cylinder
156: pressurizing portion
158: pressure receiving chamber
166: fuel injection nozzle

The invention claimed is:

1. A fuel supply pump having a tappet structural body which includes a roller and a tappet body portion which houses the roller, which supplies a fuel under pressure by pressurizing the fuel, wherein:

a) the tappet body portion includes a body portion which has a roller receiver having an inner peripheral surface which conforms to an outer peripheral surface of the roller and a cylindrical slide portion which extends upwardly from an end portion of an upper surface of the body portion b) the roller is rotatably held by the roller receiver of the tappet body portion, c) the fuel supply pump includes plate-like restricting means which restrict a movement of the roller in the rotary axis direction, d) each of the plate-like restricting means is constituted by extending a portion of the peripheral portion of a spring seat in a direction toward each end of the roller, e) each of the plate-like restricting means is inserted in an insertion hole which is formed in the tappet body portion between an inside of the cylindrical slide portion and an outside of the tappet body portion and the spring seat is housed inside of the cylindrical slide portion, and f) a gap is formed around the plate-like restricting means in the insertion hole.

2. A fuel supply pump according to claim 1, wherein the roller includes a pin portion which constitutes the center of rotation of the roller and a roller portion which is a thick wall portion which is formed around the pin portion and is rotatable while being in a slide contact with a roller body and the pin portion and the roller portion are integrally formed.

3. A fuel supply pump according to claim 1, wherein the fuel supply pump is applicable to a booster-type accumulator fuel injection device which pressurizes fuel having a flow rate per unit time of 500 to 1500 litter/hour to a value of 50 MPa or more.

4. A fuel supply pump having a tappet structural body which includes a roller and a tappet body portion which houses the roller, which supplies a fuel under pressure by pressurizing the fuel, wherein a) the tappet body portion includes a body portion which has a roller receiver having an inner peripheral surface which conforms to an outer peripheral surface of the roller and a cylindrical slide portion which extends upwardly from an end portion of an upper surface of the body portion, b) the roller is rotatably held by the roller receiver of the tappet body portion, c) the fuel supply pump includes plate-like restricting means which restrict a movement of the roller in the rotary axis direction, d) each of the plate-like restricting means is constituted by extending a portion of the peripheral portion of a spring seat in a direction toward each end of the roller, e) each of the plate-like restricting means is inserted in an insertion hole which is formed in the tappet body portion between an inside of the cylindrical slide portion and an outside of the tappet body portion without spreading a distance of each of the plate-like restricting means and the spring seat is housed inside of the cylindrical slide portion, and f) a gap is formed around the plate-like restricting means in the insertion hole.

5. A fuel supply pump according to claim 4, wherein the roller includes a pin portion which constitutes the center of rotation of the roller and a roller portion which is a thick wall portion which is formed around the pin portion and is rotatable while being in a slide contact with a roller body and the pin portion and the roller portion are integrally formed.

6. A fuel supply pump according to claim 4, wherein the fuel supply pump is applicable to a booster-type accumulator fuel injection device which pressurizes fuel having a flow rate per unit time of 500 to 1500 litter/hour to a value of 50 MPa or more.

* * * * *